(12) United States Patent
Comay et al.

(10) Patent No.: US 12,348,546 B2
(45) Date of Patent: *Jul. 1, 2025

(54) NAME TRANSLATION MONITORING

(71) Applicant: FORESCOUT TECHNOLOGIES, INC., San Jose, CA (US)

(72) Inventors: Oded Comay, Tel Aviv (IL); Oren Nechushtan, Ramat Gan (IL)

(73) Assignee: Forescout Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,702

(22) Filed: Feb. 26, 2024

(65) Prior Publication Data

US 2025/0030715 A1    Jan. 23, 2025

Related U.S. Application Data

(63) Continuation of application No. 17/391,820, filed on Aug. 2, 2021, now Pat. No. 11,916,943, which is a continuation of application No. 16/752,289, filed on Jan. 24, 2020, now Pat. No. 11,108,799, which is a continuation of application No. 15/377,119, filed on Dec. 13, 2016, now Pat. No. 10,574,678.

(51) Int. Cl.
*H04L 9/40* (2022.01)
*H04L 61/4511* (2022.01)
*H04L 61/5007* (2022.01)
*H04L 61/58* (2022.01)
*H04L 61/59* (2022.01)

(52) U.S. Cl.
CPC ...... *H04L 63/1425* (2013.01); *H04L 61/4511* (2022.05); *H04L 61/5007* (2022.05); *H04L 63/1408* (2013.01); *H04L 61/58* (2022.05); *H04L 61/59* (2022.05)

(58) Field of Classification Search
CPC ............ H04L 63/1425; H04L 61/1511; H04L 61/2007; H04L 63/1408; H04L 61/6009; H04L 61/6013
See application file for complete search history.

(56) References Cited

U.S. PATENT DOCUMENTS

| | | | |
|---|---|---|---|
| 8,656,284 B2 | 2/2014 | Ivanyi et al. | |
| 8,838,820 B2 | 9/2014 | Eidelman et al. | |
| 9,866,545 B2 | 1/2018 | Beecham | |
| 10,044,736 B1 | 8/2018 | Barger et al. | |
| 10,063,587 B2 | 8/2018 | Satish et al. | |
| 10,326,848 B2 | 6/2019 | Nath et al. | |
| 10,657,248 B2 * | 5/2020 | Lowry | G06F 16/1734 |
| 10,686,805 B2 * | 6/2020 | Reybok, Jr. | H04L 63/1416 |
| 10,764,333 B2 | 9/2020 | Nagarkar | |
| 10,841,164 B2 | 11/2020 | Kampanakis et al. | |
| 10,848,448 B2 | 11/2020 | El-Alfy et al. | |

(Continued)

*Primary Examiner* — Stephen T Gundry
(74) *Attorney, Agent, or Firm* — Womble Bond Dickinson (US) LLP

(57) ABSTRACT

Systems, methods, and related technologies for analyzing traffic are described. In certain aspects, network traffic is analyzed and a domain name system (DNS) message is extracted from the network traffic. Subsequent network traffic is monitored and analyzed based on the DNS message and in view of one or more criteria. In response to the one or more criteria being satisfied, an indication of compromise (IoC) for a device is determined.

20 Claims, 6 Drawing Sheets

(56) References Cited

U.S. PATENT DOCUMENTS

| | | |
|---|---|---|
| 10,958,649 B2 | 3/2021 | Delcourt et al. |
| 11,159,576 B1 | 10/2021 | Ly et al. |
| 11,232,202 B2 | 1/2022 | Maimon et al. |
| 11,295,010 B2 | 4/2022 | Lowry et al. |
| 11,399,288 B2 | 7/2022 | Jochem Sanz |
| 11,843,622 B1 * | 12/2023 | Tellez ................. H04L 63/1425 |
| 11,888,870 B2 * | 1/2024 | Garyani ................ G06F 21/554 |
| 11,947,698 B2 * | 4/2024 | Struttmann .......... G06F 16/9014 |
| 12,126,639 B2 * | 10/2024 | Jiang .................... H04L 63/1416 |
| 12,177,180 B2 * | 12/2024 | Moore ................ H04L 63/0263 |
| 12,184,696 B2 * | 12/2024 | Subbanna ........... H04L 63/1416 |
| 2007/0100967 A1 | 5/2007 | Smith et al. |
| 2007/0128899 A1 | 6/2007 | Mayer |
| 2007/0136788 A1 | 6/2007 | Monahan et al. |
| 2008/0052384 A1 * | 2/2008 | Marl ................... H04L 12/2807 |
| | | 709/224 |
| 2008/0177994 A1 | 7/2008 | Mayer |
| 2009/0157708 A1 | 6/2009 | Bandini et al. |
| 2010/0268524 A1 | 10/2010 | Nath et al. |
| 2012/0259993 A1 | 10/2012 | Eidelman et al. |
| 2014/0157405 A1 * | 6/2014 | Joll ..................... H04L 63/1425 |
| | | 726/22 |
| 2016/0036943 A1 | 2/2016 | Kish et al. |
| 2016/0164825 A1 | 6/2016 | Riedel et al. |
| 2016/0277293 A1 | 9/2016 | Lopez |
| 2017/0250953 A1 * | 8/2017 | Jain ....................... G06F 21/552 |
| 2017/0310692 A1 * | 10/2017 | Ackerman .......... H04L 63/1425 |
| 2017/0331780 A1 | 11/2017 | Reddy et al. |
| 2018/0077134 A1 | 3/2018 | Beecham |
| 2018/0097835 A1 * | 4/2018 | McGrew ............... H04L 63/145 |
| 2018/0131665 A1 | 5/2018 | Joffe et al. |
| 2018/0332064 A1 | 11/2018 | Harris et al. |
| 2018/0332074 A1 | 11/2018 | Satish et al. |
| 2018/0357422 A1 | 12/2018 | Telang et al. |
| 2020/0092312 A1 | 3/2020 | Caldwell et al. |
| 2020/0250303 A1 * | 8/2020 | Lowry ................ G06F 11/3409 |
| 2020/0314124 A1 | 10/2020 | Reybok, Jr. et al. |
| 2021/0105251 A1 * | 4/2021 | Baldwin ............. H04L 63/1466 |
| 2021/0258791 A1 | 8/2021 | Jochem |
| 2022/0125905 A1 | 4/2022 | Adusumilli et al. |
| 2022/0247761 A1 | 8/2022 | Subbanna et al. |
| 2022/0247768 A1 | 8/2022 | Datar et al. |
| 2022/0247785 A1 | 8/2022 | Ly et al. |
| 2022/0247788 A1 | 8/2022 | Subbanna et al. |
| 2024/0184908 A1 * | 6/2024 | Beecham ............. H04L 9/0894 |
| 2024/0256659 A1 * | 8/2024 | Hyder .................. G06F 21/566 |
| 2024/0275817 A1 * | 8/2024 | Grout ................. H04L 63/1425 |
| 2024/0277842 A1 * | 8/2024 | Weinberg ............. A61K 45/06 |
| 2024/0378285 A1 * | 11/2024 | Lim ....................... G06F 21/554 |
| 2025/0071092 A1 * | 2/2025 | Moore ................ H04L 63/0263 |
| 2025/0112935 A1 * | 4/2025 | Szurdi ...................... H04L 63/20 |

\* cited by examiner

NAME TRANSLATION MONITORING

CROSS-REFERENCE TO RELATED APPLICATIONS

This application is a continuation of U.S. application Ser. No. 17/391,820 filed Aug. 2, 2021, which is a continuation of U.S. application Ser. No. 16/752,289, filed Jan. 24, 2020, issued as U.S. Pat. No. 11,108,799 on Aug. 31, 2021, which is a continuation of U.S. application Ser. No. 15/377,119, filed Dec. 13, 2016, issued as U.S. Pat. No. 10,574,678 on Feb. 25, 2020, the entire contents of which are hereby incorporated by reference.

TECHNICAL FIELD

Aspects and implementations of the present disclosure relate to network monitoring, and more specifically, to monitoring and analyzing traffic based on naming information available via a communication network.

BACKGROUND

As technology advances, the number and variety of devices that are connected to communications network are rapidly increasing. The increase in devices has resulted in an increase in network traffic. With the increase in network traffic, the increasing amounts of traffic data make having insights into the activity of devices more valuable. Understanding network traffic of devices connected to a network can be useful for monitoring or securing the communication network in order to prevent unauthorized or rogue devices from accessing network resources.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
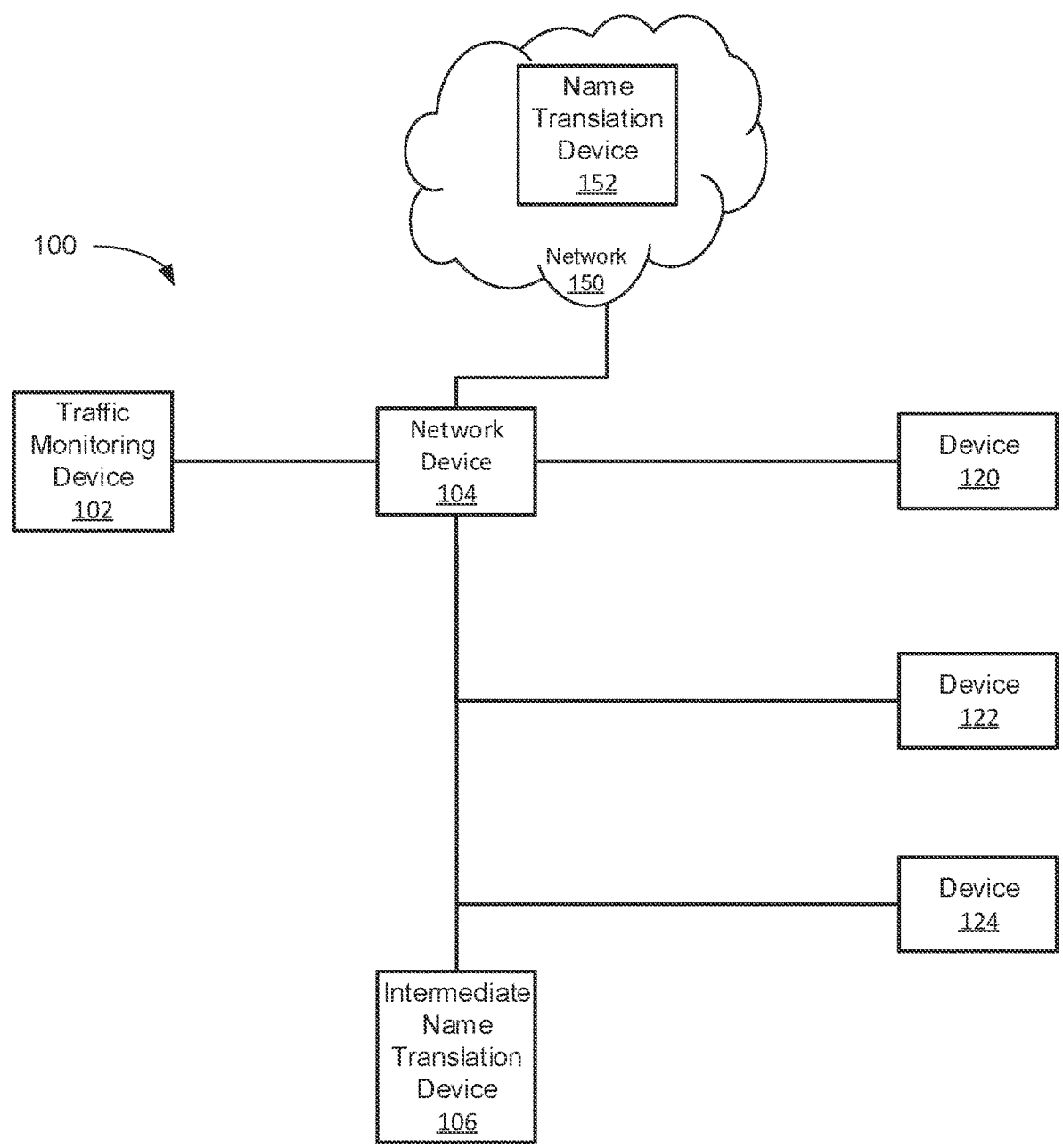
FIG. 1 depicts an illustrative communication network in accordance with one implementation of the present disclosure.

Aspects and implementations of the present disclosure are directed to device classification. The systems and methods disclosed can be employed with respect to network security, among other fields. More particularly, it can be appreciated that access to network resources by unauthorized devices is a significant and growing problem. At the same time, the proliferation of network-connected devices (e.g., smartphones, tablets, wearable devices, etc.) can make it difficult to effectively manage access to network resources for those users or devices that are authorized. Accordingly, described herein in various implementations are systems, methods, techniques, and related technologies, that enable the ongoing monitoring of network devices and activity and provide the ability to control access to network resources (e.g., by defining and employing access policies which dictate the types of devices that are or are not authorized to access certain network resources, the circumstances under which such access is or is not permitted, etc.).

With current methodologies for analyzing traffic there is a separation between different types of traffic. For example, there is a separation between source and destination addresses, ports, protocols, and associated names. Solutions coupling or correlating this information can enable a variety of function including increasing security and performance.

In order to effectively implement network access security and policies, it may be advantageous to identify, classify, or otherwise determine various aspects, features, or characteristics of devices that are connected to a network or what the devices are (or are not) doing on the network.

Accordingly, described herein in various implementations are systems, methods, techniques, and related technologies, which enable the traffic analysis of devices that are coupled to a network to determine a variety of characteristics about the devices. As described herein, name translation traffic and information therefrom can be used to classify a device, classify a session, perform compromise detection, and perform intrusion detection.

Accordingly, it can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

The communications that a device is involved in can reveal information about the device. Embodiments are operable to use information from device communications, in particular name translation traffic, for device classification, session classification, intrusion detection, compromise detection, etc.

For example, raw TCP/IP traffic includes, among other things, the IP addresses of communicating devices. Using the names (e.g., domain name system (DNS)) of the communicating devices provides additional information and insight to the traffic, and can make the analysis more accurate and effective, depending on the accuracy of the correlation. Embodiments include systems, and methods, that leverage visibility into traffic including name (e.g., DNS name) traffic in a network to perform the aforementioned analysis.

When viewed from a network perspective there are two fingerprints on the network for communication, one is the host or device looking for a name (e.g., DNS name via a DNS request) and the other fingerprint is the communication between two addresses and ports. While both fingerprints have value, together they are much more useful. Based on associating the name information with a particular host allows various functions to be performed including classifying the host, classifying a session of the host, detecting whether the host has been compromised, and determining if the host may be involved in an intrusion.

It is noted that a name response (e.g., DNS response) may be sent to an intermediate name translation device therefore associating the name and address with the intermediate translation device may not be particularly useful. Embodiments overcome this issue by monitoring traffic to the address (e.g., internet protocol (IP) address) associated with the name of the name translation response. The association of the name with the address can be used before expiration of the period (e.g., time to live (TTL)) specified in the name translation response.

It is noted that the storing of the mapping of the name and address can operate as a substitute for reverse name translation (e.g., translation of an IP address to DNS name). It is appreciated that making reverse name requests to current naming methodologies may not work well because the reverse lookup may not be defined or multiple names may be associated with a single IP address addresses. For example, if smartphone.update.manufacturer.com and television.update.manufacturer.com are associated with the same address, then it will be difficult to separate a television and a smartphone because they are both using the same address and a single name may be returned from a reverse name lookup request.

Embodiments can further differentiate similar names based on a time period associated with the name translation request. For example, if smartphone.update.manufacturer.com and television.update.manufacturer.com are associated with the same address, if the name translation response for smartphone.update.manufacturer.com is observed by a traffic monitoring device (e.g., traffic monitoring device 102) and the IP address associated with smartphone.update.manufacturer.com is observed a short period of time after, traffic monitoring device can accurately associate smartphone.update.manufacturer.com with the device that sent the packet with the IP address associated with smartphone.update.manufacturer.com.

FIG. 1 depicts an illustrative communication network 100 in accordance with one implementation of the present disclosure. The communication network 100 includes a traffic monitoring device 102, a network device 104, intermediate name translation device 106, and devices 120-124. The devices 120-124 may be any of a variety of devices including, but not limited to, computing systems, laptops, smartphones, servers, Internet of Things (IoT) devices, etc. It is noted that the devices of communication network 100 may communicate in a variety of ways including wired and wireless connections and may use one or more of a variety of protocols.

Network device 104 may be one or more network devices configured to facilitate communication among devices 120-124 and traffic monitoring device 102. Network device 104 further communicatively couples network 100 and network 150. Network device 104 may include one or more network switches, access points, routers, firewalls, hubs, etc.

Network 150 may include one or more networks including the Internet. Network 150 includes name translation device 152 which is operable to translate a name into an address (e.g., IP address). Name translation device 152 may implement one or more name translation systems or protocols including, but not limited to, the domain name system (DNS), the network information service (NIS) (formerly yellow pages or YP), the NetBIOS name service (NBNS), or link-local multicast name resolution (LLMNR). If the name translation device 152 does not have an address translation for the name of the name translation request, the name translation device 152 may contact other name translation devices (not shown).

Intermediate name translation device 106 can receive name translation requests (e.g., to translate a name into an address) from devices 120-124 and can send name translation responses (e.g., including an address associated with the name of the name translation request). Based on the name in the request, intermediate name translation device 106 can respond to a name translation request if it has that the address associated with the name of the name translation request (e.g., the translation of the name into an address, such as an IP addresses, is stored locally or cached). For example, the intermediate name translation device 106 may act as a local name translation cache for device of network 100.

If intermediate name translation device 106 does not have the address associated with the name of the name translation request, intermediate name translation device 106 sends the request to the name translation device 152 (via network device 104). Name translation device 152 then responds to intermediate name translation device 106 with a name translation response including the address associated with the name of the name translation request. Intermediate name translation device 106 then sends the name translation response to the device that sent the name translation request (e.g., device 120, 122, or 124).

Intermediate name translation device 106 may implement one or more name translation systems or protocols including, but not limited to, the domain name system (DNS), the network information service (NIS) (formerly yellow pages or YP), the NetBIOS name service (NBNS), or link-local multicast name resolution (LLMNR). The intermediate name translation device 106, the name translation device 152, or both may support reverse name translation or translation of an address (e.g., IP address) to a name (e.g., domain name).

Device 120 may send a name translation request to name translation device 152 (e.g., via network device 104). Name translation device 152 may then send a name translation response in response to the name translation request to device 120 (e.g., via network 104).

Traffic monitoring device 102 may be operable for a variety of tasks including monitoring network traffic, which can include name resolution or translation traffic. Traffic monitoring device 102 may monitor network traffic through network device 104 for name translation response traffic or packets. Traffic monitoring device 102 may include one or more devices able to perform one or more traffic monitoring tasks or portions thereof, as described herein. For example, traffic monitoring device 102 may include a first device that monitors name translation traffic, a second device that monitors non-name translation traffic, and a third device that monitors traffic from a different part of the network. More than one traffic monitoring device 102 may be used or present on a network.

Traffic monitoring device 102 may be further operable to classify a device, classify a session, perform intrusion detection, perform compromise detection, or a combination thereof. The device 102 may be a computing system, a network device (e.g., router, firewall, network access control (NAC) device, access point, intrusion prevention system (IPS), intrusion detection system (IDS), deception device, cloud-based device, virtual machine based system, etc.). The device 102 may be communicatively coupled to network device 104 in such a way as to receive network traffic flowing through network device 104 (e.g., port mirroring).

For example, traffic monitoring device 102 may monitor network traffic for DNS response traffic and extract DNS response questions or queries (e.g., including DNS names) and answers or replies (e.g., including IP addresses) from the DNS response traffic (e.g., a packet). Traffic monitoring device 102 may then create a dynamic mapping between the extracted IP addresses and DNS names.

Traffic monitoring device 102 may analyze subsequent traffic and IP addresses of the subsequent traffic combined with the DNS names based on the dynamic mapping. This mapping of IP addresses to DNS information may then be used for a variety of tasks (e.g., to classify the device, classify a device session, perform intrusion detection, or compromise detection).

For example, traffic monitoring device 102 can observe traffic of a television (e.g., device 122). The television may check each day for updates to its firmware. To check for an update, the television sends a DNS request (e.g., to intermediate name translation device 106 or name translation device 152) to translate tv.update.manufacturer.com to an IP address. The television then receives a DNS response (e.g., from intermediate name translation device 106 or name translation device 152) which includes the IP address of 173.133.242.231 which is associated with tv.update.manufacturer.com. The DNS response will be observed by traffic monitoring device 102, and traffic monitoring device 102 will store a mapping of the DNS name to the IP address(es) of the DNS response. Traffic monitoring device 102 may further store a time period (e.g., time to live (TTL)) with the mapping of the DNS name and the IP address. The television will then send a request to communicate with the http://173.133.242.231:1224 where 173.133.242.231 is the IP address translation of tv.update.manufacturer.com and 1224 is the port number where the firmware update service can accept connections.

In some embodiments, encrypted or secure name translation requests may be sent to intermediate name translation device 106. Intermediate name translation device 106 responses to the name translation requests, unencrypts or decodes the secure name translation requests, and sends the name translation requests to traffic monitoring device 102. Intermediate name translation device 106 may further send name translation responses based on the name translation requests where it can translate the names of the name translation requests, otherwise it may communicate with name translation device 152 for determining name translation responses. Traffic monitoring device 102 may use the name translation requests to make and store mappings of address(es) and names based on the name translation requests (e.g., using translations from intermediate name translation device 106, name translation device 152, or a combination thereof), as described herein.

Figure 2:
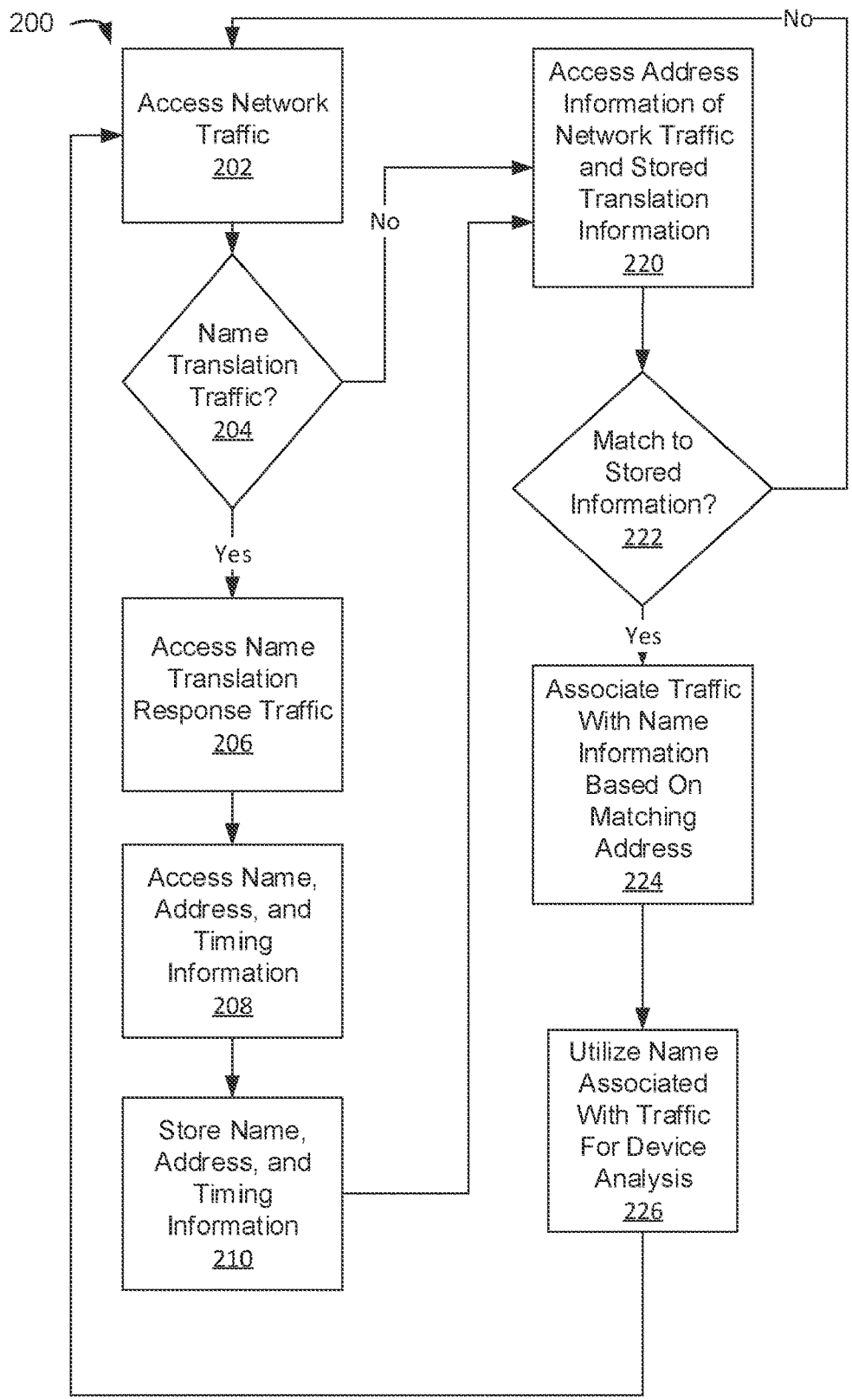
FIG. 2 depicts a flow diagram of aspects of a method for analyzing network traffic including naming information in accordance with one implementation of the present disclosure.
Figure 3:
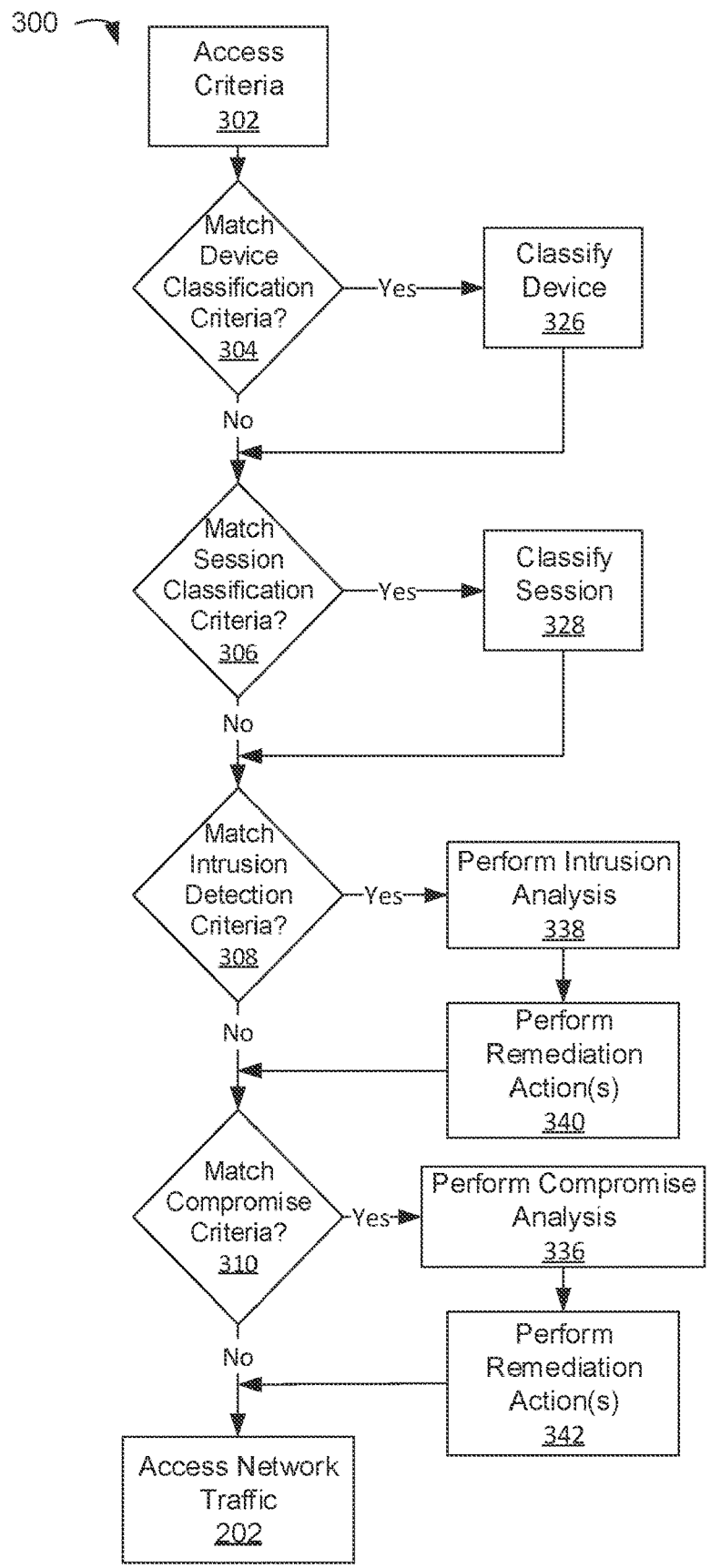
FIG. 3 depicts a flow diagram of aspects of a method for analyzing a device based on naming information in accordance with one implementation of the present disclosure.
Figure 4:
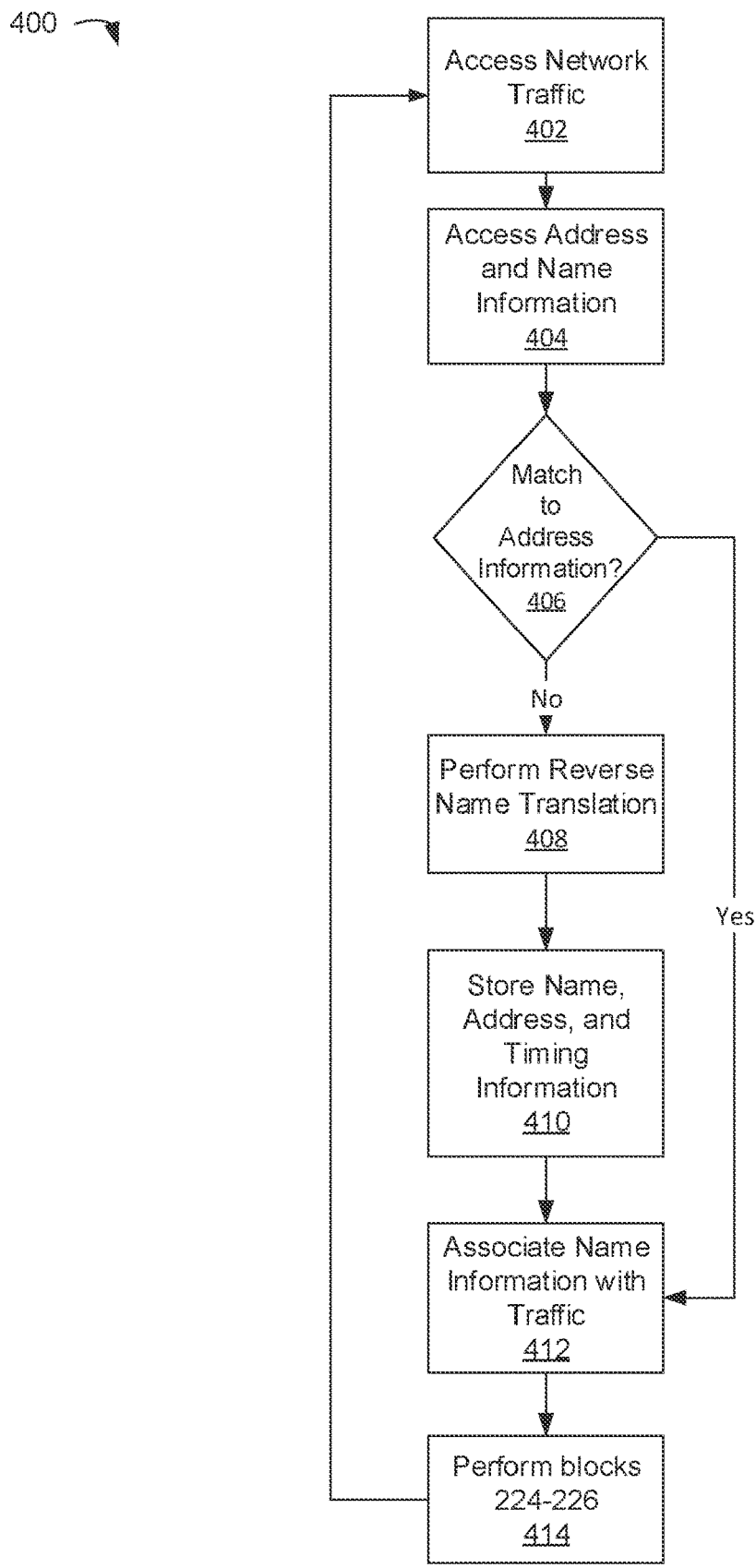
FIG. 4 depicts a flow diagram of aspects of a method for analyzing network traffic including reverse name lookup in accordance with one implementation of the present disclosure.

With reference to FIGS. 2-4, flowcharts 200-400 illustrate example functions used by various embodiments. Although specific function blocks ("blocks") are disclosed in flowcharts 200-400, such steps are examples. That is, embodiments are well suited to performing various other blocks or variations of the blocks recited in flowcharts 200-400. It is appreciated that the blocks in flowcharts 200-400 may be performed in an order different than presented, and that not all of the blocks in flowcharts 200-400 may be performed.

FIG. 2 depicts a flow diagram of aspects of a method for analyzing network traffic including naming information in accordance with one implementation of the present disclosure. The flowchart 200 of FIG. 2 may be performed by traffic monitoring device 102 or any system configured to perform monitoring of traffic and processing of name translation traffic.

At block 202, network traffic is accessed. The network traffic may be accessed (e.g., via sniffing) or received from a network device (e.g., network device 104). For example, the network traffic may be received via port mirroring.

At block 204, whether name translation traffic is present in the network traffic is determined. If name translation traffic is present in the network traffic, block 206 is performed. If name translation traffic is not present in the network traffic, block 220 is performed.

At block 206, name translation response traffic is accessed (if present). For example, a DNS response packet may be accessed. The name translation response traffic may be a name translation response that was sent to an intermediate name translation device (e.g., intermediate name translation device 106) or a device (e.g., one of devices 120-124) in response to a name translation request.

At block 208, name, address(es), and timing information is accessed. The name, address(es), and timing information may be extracted or copied from the name translation response. The name and address information can be specific to particular system or protocol being used for naming on the network, e.g., DNS, NBNS, WINS, and LLMNR. For example, the name can be a domain name (including a host name) of tablet.update.manufacturer.com and the address can be an IP address that was sent in response to a DNS query or request. The accessing of the timing information may be optional. The time information may include an expiration time or period for which the name and address information is a valid translation, e.g., time to live (TTL). In some cases, there may be multiple addresses that are accessed from the name translation response traffic (e.g., packet).

At block 210, the name, address(es), and timing information is stored. The name, address(es), and timing information may be stored in a table or other data structure operable to be accessed at a later point in time, e.g., after additional or subsequent traffic has been accessed. For example, the name, address, and timing information may be stored in a respective columns of a row of a table. Name, address, and timing information may be dynamically added to data structure and dynamically updated. Block 202 may optionally be performed after block 210.

At block 220, address information of a packet and stored translation information is accessed. The packet is a packet of non-name translation traffic. For example, the packet may be a request to establish a connection to download a firmware update, website, or other file. The stored translation information (if any) can include one or more tuples of name, address, and time information, as described herein. The stored translation information may have been stored as part of performance of block 210. Block 220 may also be performed with respect to name translation response traffic (e.g., after blocks 206-210 and to associate the name of a name translation device with a device based on a name translation response).

At block 222, whether there is a match of the address information to stored information is determined. The matching of the address information and stored information may be based on a source address, a destination address, or both matching the stored information. Packets with address information that matches the stored information may thus be packets for communications to and from a client and to and from a server.

In some cases, there may be a match of both the source and destination addresses of a packet with the stored information. For example, if a client requests DNS information for a server and the server requests DNS information for the client there may be DNS information stored for both the client and the server.

If there is a match of the address information and stored information, block 224 is performed. If there is not a match of the address information and stored information, block 202 is performed.

At block 224, traffic with the matching address is associated with the name information. For example, a packet may be associated with the name information of tv.update.manufacturer.com. The name information may also be associated with the source and destination addresses of the packet. For example, a client and server may be associated with respective name information. The device that sends the packet may be associated with the name.

At block 226, analysis of the device using the name information associated with the traffic is performed. The device analysis may include a variety of types of analysis including device classification analysis, session classification analysis, compromise analysis, and intrusion analysis, as described herein.

FIG. 3 depicts a flow diagram of aspects of a method for analyzing a device based on naming information in accordance with one implementation of the present disclosure. The flowchart 300 of FIG. 3 may be performed as part of block 226. The flowchart 300 of FIG. 3 may be performed by traffic monitoring device 102 or any system configured to perform monitoring of traffic and processing of name translation traffic. The blocks 326-330 may be individually performed or performed in some combination thereof and not all of blocks 326-330 may be perform during analysis of a device (e.g., block 226).

At block 302, criteria are accessed. The criteria may be a variety of security or other related characteristics for use with the name information (e.g., associated with traffic in block 224) including, but not limited to, device classification characteristics (e.g., DNS names of servers with which the device communicates, MAC addresses or address ranges, ports, and behavior patterns), session classification characteristics (e.g., DNS names associated with a service, ports, or protocols), an intrusion signature, an indicator of compromise (IoC) signature, other security signature, or combination thereof. The criteria may be received or accessed from a third party system. For example, a signature may be accessed from a vulnerability assessment (VA) system or an advanced threat detection (ATD) system.

At block 304, whether device classification criteria are matched is determined. If the name information matches the device classification criteria, block 326 is performed. If the name information does not match the device classification criteria, block 306 is performed.

At block 326, the device that sent the traffic with the matching address (e.g., from block 222) is classified. The device may be classified as a device type and further classified based on the manufacturer and model. The classification of a device may be used, for example, for asset management purposes, or to apply security policies and control the access to various network resources.

The classification of a device may be based on name information, port information, and behavior. For example, if a device sent a packet to an address that translates to tv.update.manufacturer.com, the device may be classified as a television by the manufacturer based on the domain name, subdomain name, host name, or combination thereof of the name information. As another example, if a device sent a packet to an address that translates to tv.update.manufacturer.com with a port of 1234, the device may be classified as a television by a particular manufacturer based on the manufacturer using port 1234 for update checks or requests. Device behavior may also be used to classify the device as a particular device or by a particular manufacturer if a manufacturer by default configures its devices to check for updates at 6:15 am each day. As another example, a frequency of accessing an update site (e.g., at 24 hour intervals) may be used to classify the device as a particular device or by a particular manufacturer.

The classification of a device may be updated periodically or as more name information becomes available thereby allowing updated, more accurate, and fine-grained device classification.

A security policy may be optionally applied based on the device classification. The application of the security policy to the classified device may be based on the device meeting particular criteria of the policy. Security policy actions may be applied in real-time.

A security policy may be created based on the classification of the device. For example, if the device classified is an industrial control system, a security policy may be configured according to a default security policy for industrial controls system which prevents the industrial control system from accessing the Internet.

At block 306, whether session classification criteria are matched is determined. If the name information or other information (e.g., port information) matches the session classification criteria, block 328 is performed. If the name information does not match the device classification criteria, block 308 is performed.

At block 328, a session associated with the traffic with the matching address is classified. The session classification may indicate an application being used by a device. For example, if a device sends a request with an IP address associated with www.socialnetworksite.com and port 80, then the session of the device may be classified as being a socialnetworksite.com application session. The session classification could further be used for device classification. For example, based on information that smartphones and computing devices (e.g., laptops and desktops) use the socialnetworksite.com application, a device communicating with socialnetworksite.com may be classified as a smartphone, laptop, or desktop. The device classification may further be refined based on other name information associated with the device to be more precise.

Session classification may also be used to detect suspicious activity. For example, if a device is classified as a conveyor belt (e.g., following communication with a conveyor belt control application), if the conveyor belt is observed attempting to communicate with a social networking website, the activity may be reported to a system administrator. Also, if the conveyor belt is known to use a particular port of 1338 or protocol to communicate with the conveyor belt control application and the conveyor belt is observed communicating on port 25 (or simple mail transport protocol (SMTP)) that may be an indication that something malicious has happened.

At block 308, whether there is a match to intrusion detection criteria is determined. For intrusion detection, the criteria may be a server associated with criminal activity and received from an intrusion prevention system (IPS) engine. For example, the IPS criteria can indicate that www.evil.org is a web site containing exploits of vulnerabilities known to exist in certain browsers. Therefore, attempts to connect to www.evil.org may indicate an intrusion attempt.

If there is a match to the intrusion detection criteria, block 338 is performed. If there is not a match to the criteria, block 310 is performed.

At block 338, intrusion analysis is performed, e.g., based on a match of an intrusion criteria. The intrusion analysis may include analyzing the device and its traffic to determine the device has evidence of an intrusion or is being used for an intrusion or attempted intrusion. For example, if www-.evil.org is known to host malicious code, then communicating with it may be an indication of an intrusion attempt.

At block 340, one or more remediation actions are performed. The remediation actions may include changing network access of the device (e.g., changing the VLAN), creating a notification (e.g., a help desk ticket) indicating that the device may be part of an intrusion attempt, and monitoring traffic of the device for security risk or suspicious behavior.

The remediation actions can further be performed based on a security policy which is applied based on device classification, session classification, or combination thereof. For example, if a device is classified as a server or using a highly sensitive financial information application, upon the device being observed connecting to a social network website, network access of the device may be restricted.

At block 310, whether there is a match to compromise detection criteria is determined. The compromise detection criteria may be a signature including a name (e.g., domain name) of a command and control server that controls compromised devices (e.g., to coordinate distributed denial of service (DDOS) attacks) received from an IoC hunter. If there is a match of the name information associated with the traffic to the compromise detection criteria, block 336 is performed. If there is not a match of the name information associated with the traffic to the compromise detection criteria, block 202 is performed.

At block 336, compromise analysis is performed, e.g., based on a match of an IoC signature. The compromise analysis may include monitoring or inspecting traffic of the device to determine if the device is in fact compromised. For example, if the device makes repeated attempts to contact a command and control server, the device may be marked as compromised or infected and a system administrator notified.

At block 342, one or more remediation actions are performed. The remediation actions may include changing network access of the device (e.g., changing the VLAN), creating a notification (e.g., a help desk ticket) indicating that the device may be compromised and monitoring traffic of the device for security risk or suspicious behavior.

The remediation actions can further be performed based on a security policy which is applied based on device classification, session classification, or combination thereof. For example, if a device is classified as a server or using a highly sensitive financial information application, upon the device being observed connecting to a social network website, network access of the device may be restricted.

FIG. 4 depicts a flow diagram of aspects of a method for analyzing network traffic including reverse name lookup in accordance with one implementation of the present disclosure. The flowchart 400 of FIG. 4 may be performed by traffic monitoring device 102 or any system configured to perform monitoring of traffic and parsing of name translation traffic. The flow chart of FIG. 4 may be performed in situations where partial or complete reverse name translation (e.g., reverse DNS) is available.

At block 402, network traffic is accessed. The network traffic may be accessed (e.g., via sniffing) or received from a network device (e.g., network device 104). For example, the network traffic may be received via port mirroring.

At block 404, address and name information is accessed. The address and name information may be accessed based on the address information of the network traffic and including a mapping or translation of address and name information. The address and name information may have been stored based on a previous network traffic (e.g., by block 410).

At block 406, whether the address of the network traffic matches the accessed address information is determined. If the address of the network traffic matches the accessed address information, block 412 is performed. If the address of the network traffic does not match the accessed address information, block 408 is performed.

At block 408, reverse name translation is performed. The reverse name translation may be performed based on sending a reverse name translation request including an address (e.g., IP address) to be translated to a name translation device (e.g., name translation device 152 or intermediate name translation device 106). The name translation device may then send a reverse name translation response including the name, address, and timing information associated with the address of the name translation request.

At block 410, name, address, and timing information is stored. The name, address, and timing information may be stored in a table or other data structure operable to be accessed at a later point in time, e.g., after additional traffic has been accessed. For example, the name, address, and timing information may be stored in respective columns of a row of a table. Name, address, and timing information may be dynamically added to data structure and dynamically updated.

At block 412, traffic with the address is associated with the name information. For example, a packet may be associated with the name information of tv.update.manufacturer-.com. The name information may also be associated with the source and destination addresses of the packet. For example, a client and server may be associated with respective name information.

At block 414, blocks 224-226 of process 200 may substantially be performed.

Figure 5:
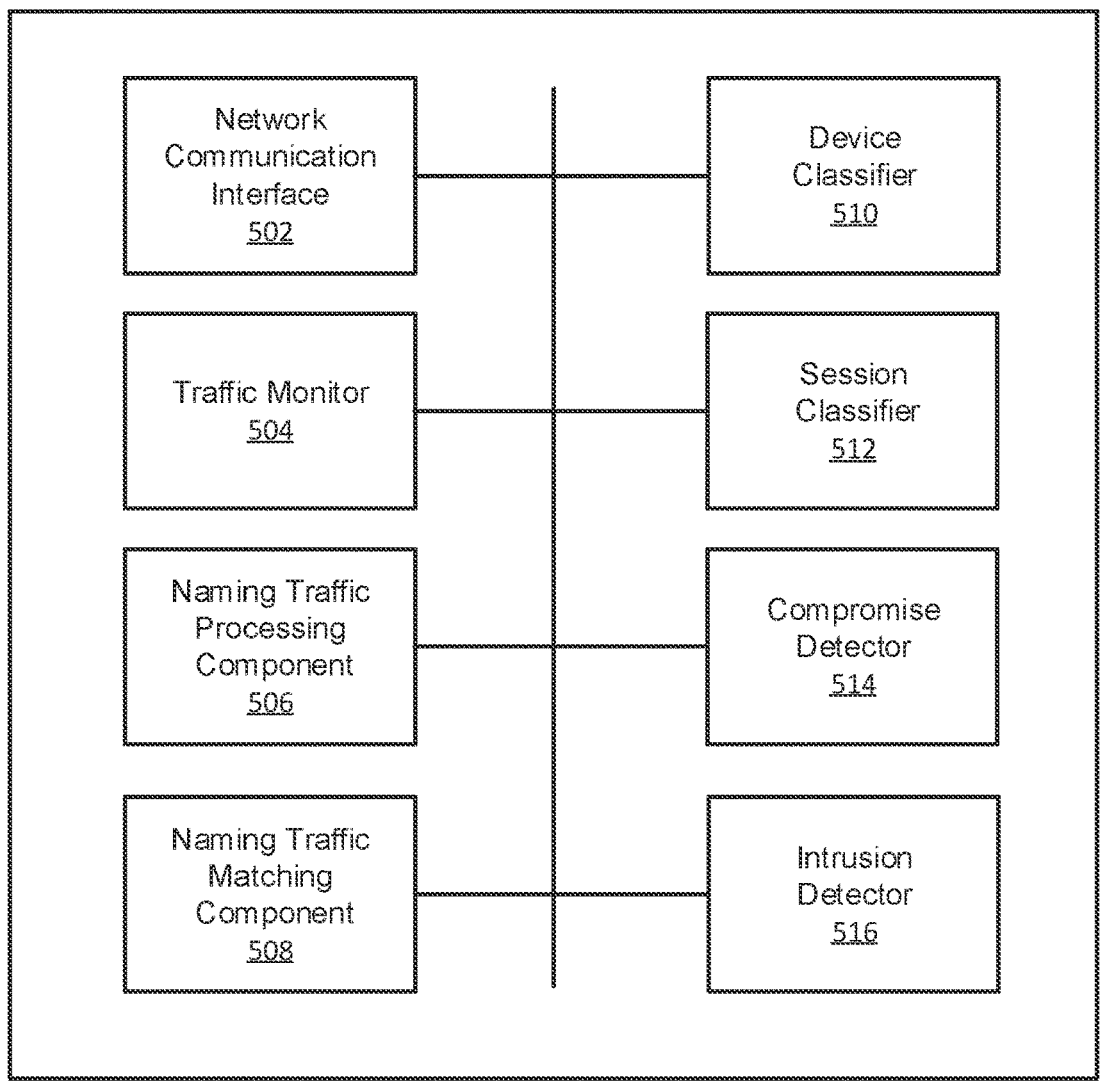
FIG. 5 depicts illustrative components of a system for network traffic analysis in accordance with one implementation of the present disclosure.

FIG. 5 illustrates example components used by various embodiments. Although specific components are disclosed in system 500, it should be appreciated that such components are examples. That is, embodiments of the present invention are well suited to having various other components or variations of the components recited in system 500. It is appreciated that the components in system 500 may operate with other components than those presented, and that not all of the components of system 500 may be required to achieve the goals of system 500.

FIG. 5 depicts illustrative components of a system for network traffic analysis in accordance with one implementation of the present disclosure. FIG. 5 shows an example system 500 including a network communication interface 502, a traffic monitor 504, a naming traffic processing component 506, a naming traffic matching component 508, a device classifier 510, a session classifier 512, a compromise detector 514, and an intrusion detector 516. The components of system 500 may be part of a computing system or other electronic device (e.g., device 102) or a virtual machine and be configured to monitor traffic and analyze name translation traffic, as described herein. For example, the system 500 may further include a memory and a processing device, operatively coupled to the memory, which may perform the functions of or execute the components of system 500. It is appreciated that the component based nature of system 400 may allow the components to be independent and allow flexibility to enable or disable individual components or to extent/upgrade components without affecting other components thereby providing scalability and extensibility.

Network communication interface 502 is configured to communicate with one or more devices (e.g., network device 104) coupled to a network that are coupled to system 500 and receive or access network traffic, as described herein.

Traffic monitor 504 is operable to access and monitor network traffic. Traffic monitor 504 is further operable to perform analysis of network traffic (e.g., in real-time) to determine whether particular portions of traffic (e.g., packets) are name translation traffic or non-name translation traffic, as described herein. In some embodiments, traffic monitor 504 may be configured to perform reverse name translation of addresses of non-name translation traffic (e.g., as described with respect to FIG. 4) and store name translation responses, as described herein.

Naming traffic processing component 506 is configured to extract name, address, and timing information from a name translation response and store the information for access with respect to other network traffic (e.g., by naming traffic matching component 508), as described herein.

Naming traffic matching component 508 is configured to match an address of network traffic to name information and associate the name information with a device. For example, naming traffic matching component 508 is configured to match an IP address of a download request to laptop.update.company.com to name information stored previously (e.g., by naming traffic processing component 506) and associate the name information with the device that sent the download request.

Device classifier 510 is configured to determine a classification of a device based on name information, as described herein. Device classifier 510 may further store a device type classification of the device. Device classifier 510 may be configured to determine the device type classification of the device periodically.

Session classifier 512 is configured to classify a session of a device based on naming information and other information (e.g., port or protocol information), as described herein.

Compromise detector 514 is configured to determine if a device is compromised or may be compromised based on matching of network traffic and naming information, as described herein. For example, if the naming information associated with an IP address within a packet from a device includes a DNS name of a malicious website, the device may be added to an interrogation or monitoring list so that suspicious activity of the device may be monitored, activity of the device restricted, a compromise of the device confirmed, or a combination thereof.

Intrusion detector 516 is configured to determine whether a device is or may be part of an intrusion attempt (e.g., based on a matching an intrusion signature), as described herein.

The system 500 may be software stored on a non-transitory computer readable medium having instructions encoded thereon that, when executed by a processing device, cause the processing device to: access (e.g., extract) a DNS response packet, where the DNS response packet includes a domain name and an internet protocol (IP) address. The instructions may further cause the processing device to access the domain name and the IP address from the DNS response packet. The instructions may further cause the processing device to access a time to live (TTL) associated with the DNS response packet.

The instruction may further cause the processing device to access a packet, sent from a device, comprising the IP address associated with a previously processed DNS response packet. The instructions may further cause the processing device to determine a security characteristic associated with the sending or receiving device.

The security characteristic may include a device classification, a session classification associated with the device, or both, as described herein. The security characteristic may further include one of an indicator of compromise (IoC) or an intrusion indicator based on a signature associated with the domain name of the DNS response packet.

An action may then be initiated based on the security characteristic of the device. The action may include changing network access of the device (e.g., changing the VLAN), creating a notification (e.g., a help desk ticket) indicating that the device has particular security characteristic, and monitoring traffic of the device based the security characteristic of the device. For example, if the security characteristic of the device includes an indicator of compromise, its network traffic may be monitored for suspicious activity, e.g., an MRI device attempting to access a social network website or communicate with a secure accounting server. If some suspicious behavior of a MRI device is detected, the action can be applied to isolate the MRI device from the secure network for further inspection, and the same time, another action to send a notification to the information technology (IT) administrator can be performed as well.

Figure 6:
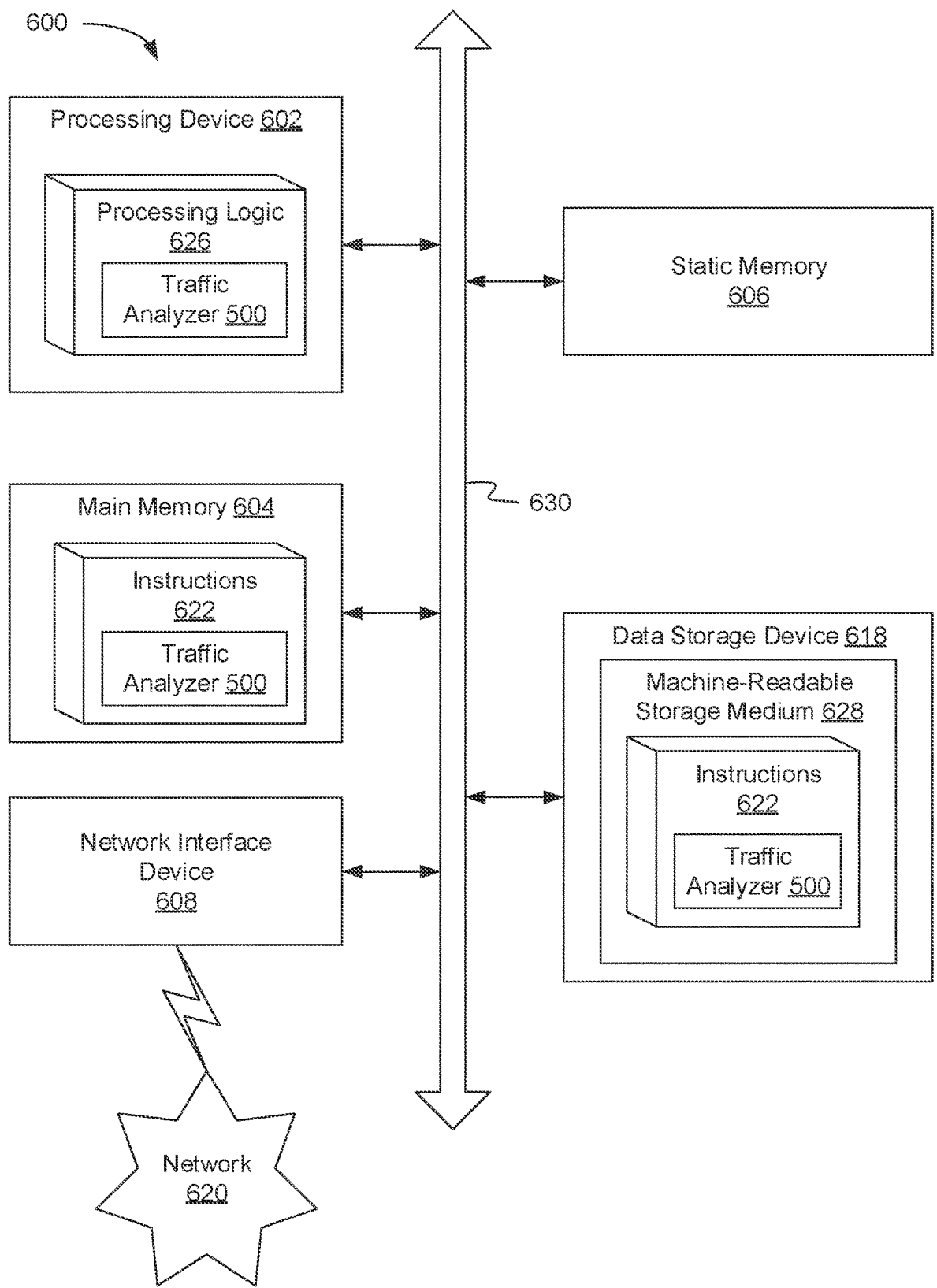
FIG. 6 is a block diagram illustrating an example computer system, in accordance with one implementation of the present disclosure.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server, such as traffic monitoring device 102 running traffic analyzer or system 500.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of system 500 shown in FIG. 5, for performing the operations and steps discussed herein.

The data storage device 618 may include a machine-readable storage medium 628, on which is stored one or more set of instructions 622 (e.g., software) embodying any one or more of the methodologies of functions described herein, including instructions to cause the processing device 602 to execute traffic analyzer 500. The instructions 622 may also reside, completely or at least partially, within the main memory 604 and/or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for traffic analysis, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
accessing network traffic;
extracting, from the network traffic, a domain name system (DNS) message;
monitoring subsequent network traffic that is associated with a device;

analyzing, by a processing device, the subsequent network traffic based on the DNS message and in view of one or more criteria which includes a port number associated with the subsequent network traffic, and in response to the one or more criteria being satisfied, determining an indication of compromise (IoC) that is associated with the device.

2. The method of claim 1, wherein the one or more criteria further comprises a DNS name of a server or an internet protocol (IP) address that is associated with the DNS message and associated with the subsequent network traffic.

3. The method of claim 2, wherein determining the IoC that is associated with the device comprises-in response to determining that the subsequent network traffic indicates communication between the device and the server that is associated with the DNS name, monitoring second subsequent network traffic associated with the device, and in response to the second subsequent network traffic from the device to the server, determining that the IoC is associated with the device.

4. The method of claim 3, wherein determining that the subsequent network traffic indicates communication between the device and the server comprises accessing a stored mapping between the DNS name and the internet protocol (IP) address and that is determined based on the DNS message.

5. The method of claim 4, wherein in response to the stored mapping being associated with a time period that is expired, the stored mapping is not used to determine that the subsequent network traffic indicates communication between the device and the server.

6. The method of claim 1, further comprising: in response to determining that the device is associated with the IoC, restricting access to the device with a virtual local area network (VLAN).

7. The method of claim 1, further comprising: in response to determining that the device is associated with IoC, notifying a system administrator.

8. The method of claim 1, further comprising:
determining a device classification of the device based on the DNS message or a second DNS message.

9. A system comprising:
a memory; and
a processing device, operatively coupled to the memory, to:
access network traffic;
extract, from the network traffic, a domain name system (DNS) message;
monitor subsequent network traffic that is associated with a device;
analyze the subsequent network traffic based on the DNS message and in view of one or more criteria which includes a port number associated with the subsequent network traffic, and
in response to the one or more criteria being satisfied, determine an indication of compromise (IoC) that is associated with the device.

10. The system of claim 9, wherein the one or more criteria further comprises a DNS name of a server or an internet protocol (IP) address that is associated with the DNS message and associated with the subsequent network traffic.

11. The system of claim 10, wherein determining the IoC that is associated with the device comprises in response to determining that the subsequent network traffic indicates communication between the device and the server that is associated with the DNS name, monitoring second subsequent network traffic associated with the device, and in response to the second subsequent network traffic from the device to the server, determining that the IoC is associated with the device.

12. The system of claim 11, wherein determining that the subsequent network traffic indicates communication between the device and the server comprises accessing a stored mapping between the DNS name and the internet protocol (IP) address and that is determined based on the DNS message.

13. The system of claim 12, wherein in response to the stored mapping being associated with a time period that is expired, the stored mapping is not used to determine that the subsequent network traffic indicates communication between the device and the server.

14. The system of claim 9, further comprising: in response to determining that the device is associated with the IoC, restricting access to the device with a virtual local area network (VLAN).

15. The method of claim 9, further comprising: in response to determining that the device is associated with IoC, notifying a system administrator.

16. A non-transitory computer readable medium having instructions encoded thereon that, when executed by a processing device, cause the processing device to:
access network traffic;
extract, from the network traffic, a domain name system (DNS) message;
monitor subsequent network traffic that is associated with a device;
analyze, by the processing device, the subsequent network traffic based on the DNS message and in view of one or more criteria which includes a port number associated with the subsequent network traffic, and
in response to the one or more criteria being satisfied, determine an indication of compromise (IoC) that is associated with the device.

17. The non-transitory computer readable medium of claim 16, wherein the one or more criteria further comprises a DNS name of a server or an internet protocol (IP) address that is associated with the DNS message and associated with the subsequent network traffic.

18. The non-transitory computer readable medium of claim 17, wherein determining the IoC that is associated with the device comprises in response to determining that the subsequent network traffic indicates communication between the device and the server that is associated with the DNS name, monitoring second subsequent network traffic associated with the device, and in response to the second subsequent network traffic from the device to the server, determining that the IoC is associated with the device.

19. The non-transitory computer readable medium of claim 18, wherein determining that the subsequent network traffic indicates communication between the device and the server comprises accessing a stored mapping between the DNS name and the internet protocol (IP) address and that is determined based on the DNS message.

20. The non-transitory computer readable medium of claim 19, wherein in response to the stored mapping being associated with a time period that is expired, the stored mapping is not used to determine that the subsequent network traffic indicates communication between the device and the server.

* * * * *